(12) United States Patent
Hiraguchi

(10) Patent No.: US 6,886,768 B2
(45) Date of Patent: May 3, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 24 days.

(21) Appl. No.: 10/386,480

(22) Filed: Mar. 13, 2003

(65) Prior Publication Data

US 2003/0173442 A1 Sep. 18, 2003

(30) Foreign Application Priority Data

Mar. 18, 2002 (JP) ........................................ 2002-074920

(51) Int. Cl.⁷ ............................................. G11B 23/107
(52) U.S. Cl. ................................... 242/348.2; 360/132
(58) Field of Search ............................. 242/348, 348.2; 360/132

(56) References Cited

U.S. PATENT DOCUMENTS

| | | | |
|---|---|---|---|
| 4,452,406 A | 6/1984 | Richard | |
| 5,261,626 A | * 11/1993 | Hoge et al. | 242/348.2 |
| 6,349,892 B2 | * 2/2002 | Morita et al. | 242/347.1 |
| 2003/0122015 A1 | * 7/2003 | Hiraguchi | 242/348.2 |

FOREIGN PATENT DOCUMENTS

JP 2001-148178 5/2001

* cited by examiner

*Primary Examiner*—John Q. Nguyen
(74) *Attorney, Agent, or Firm*—Sughrue Mion, PLLC

(57) ABSTRACT

A recording tape cartridge in which a leader block is prevented from flying out from an opening portion of a case when the cartridge is dropped. In the cartridge, a door which opens and closes the opening portion, through which the recording tape passes, is provided. A leader block, which is attached to a distal end of the recording tape, can be accommodated within the cartridge. The door is always resiliently urged in a closing direction. A groove portion is provided at the leader block. A concave rail, which movably fits together with the groove portion, is provided at the door. The leader block and the door contact one another.

24 Claims, 5 Drawing Sheets

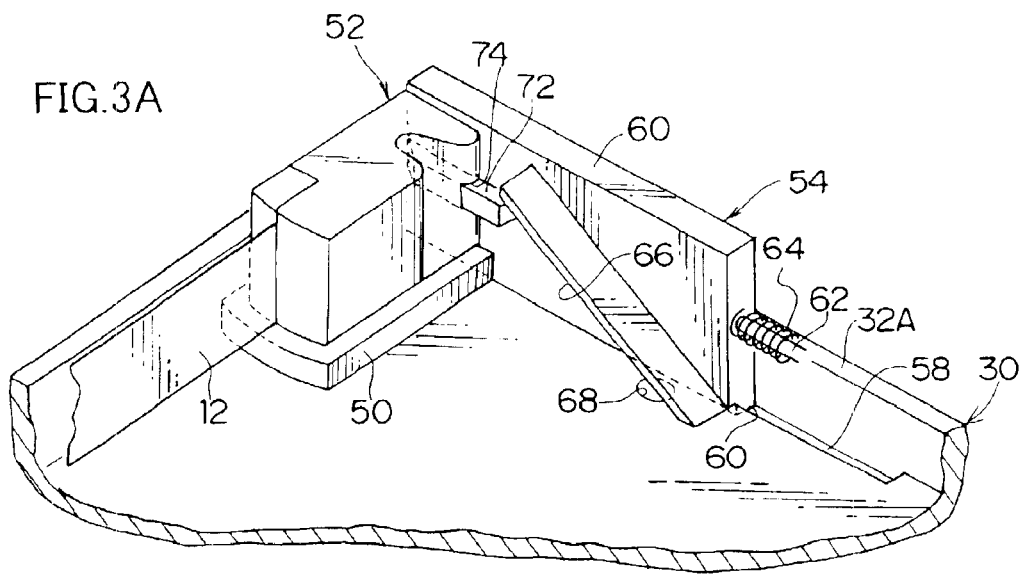
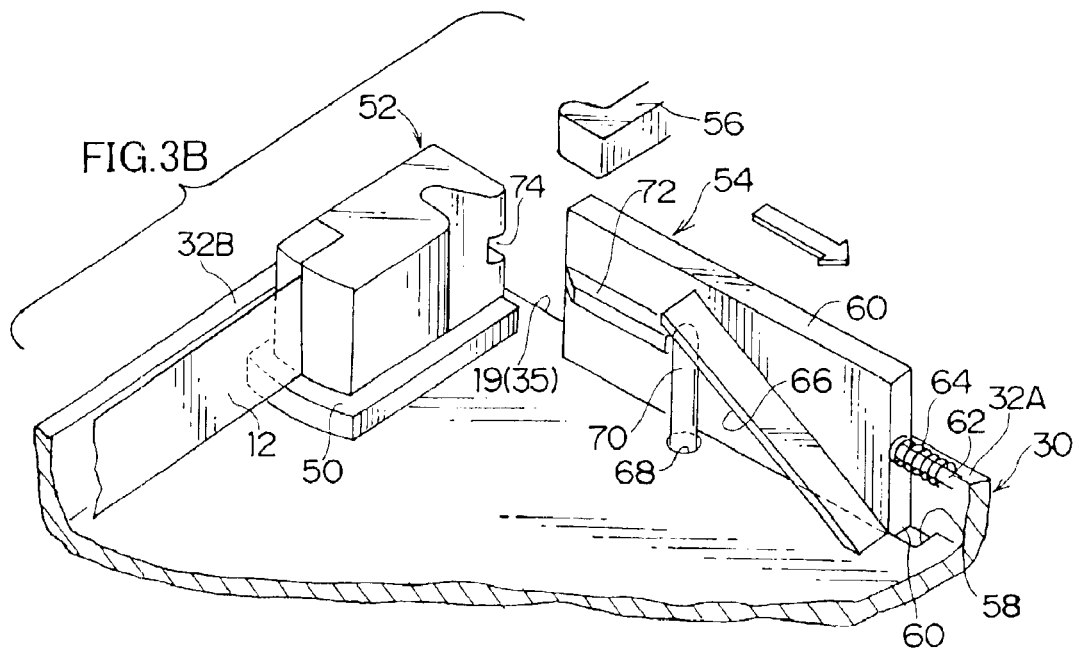

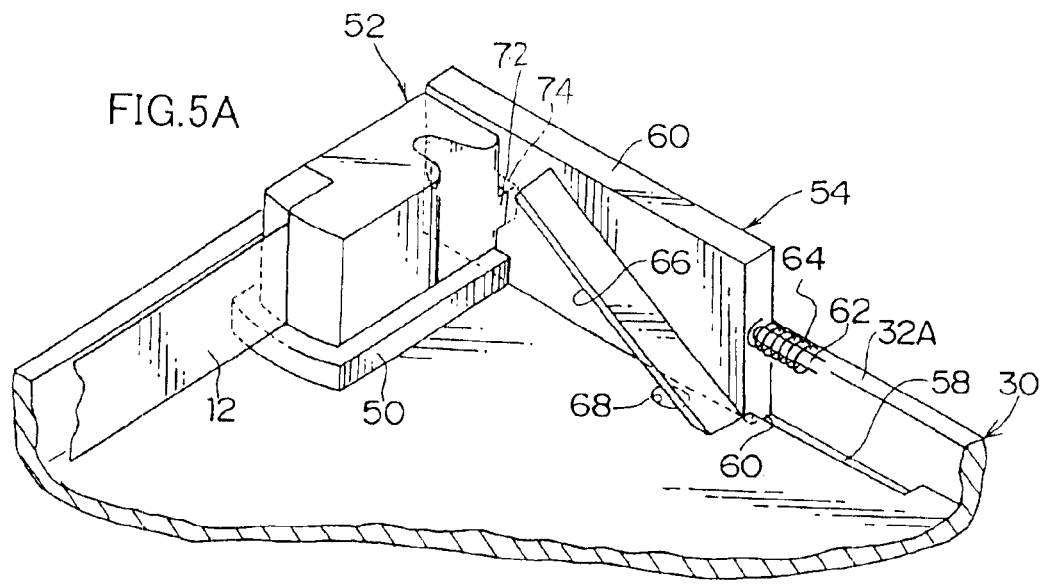
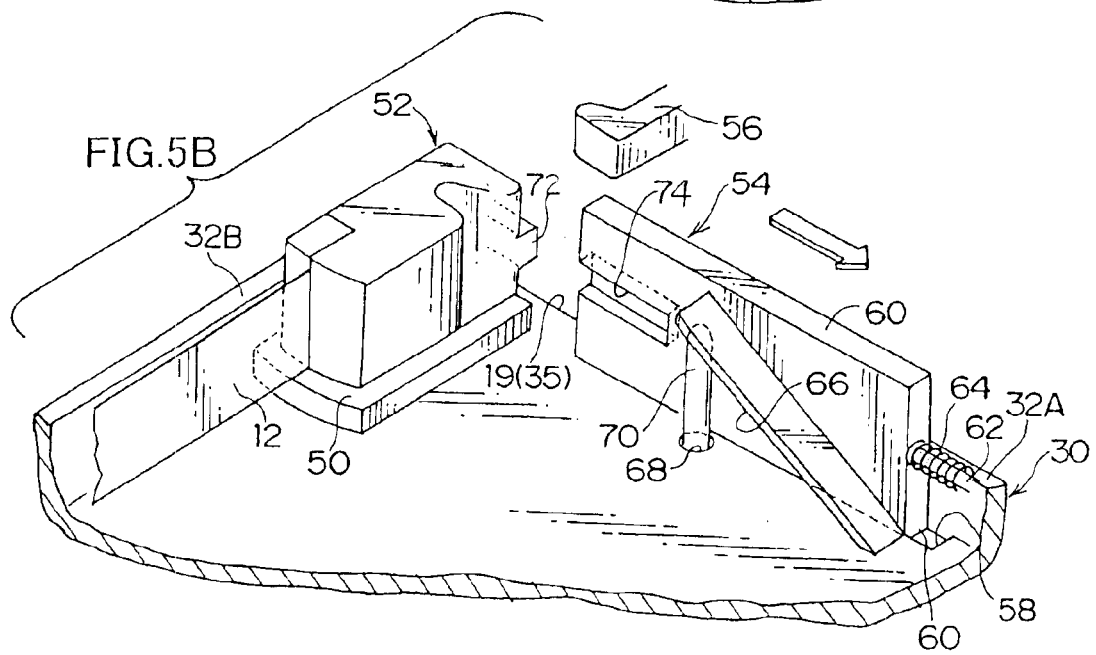

RECORDING TAPE CARTRIDGE

BACKGROUND OF THE INVENTION

1. Field of the Invention

The present invention relates to a recording tape cartridge in which a recording tape, such as a magnetic tape or the like, is wound up.

2. Description of the Related Art

Recording tapes, such as magnetic tapes or the like, are used for storage of data and information of computers, and for audio and video recording. A recording tape cartridge is used in order to prevent damage to the recording surface of the recording tape due to dust or the like adhering to the recording surface or due to the recording surface being contacted or the like. In the cartridge, a recording tape is wound on a reel, and the reel is rotatably accommodated in a case molded from resin.

A so-called single reel cartridge, which accommodates in a case a single reel on which a recording tape is wound, is known as a recording tape cartridge. This type of cartridge is used mainly for tapes for backup of information of computers or the like. When information is to be recorded or played back, the cartridge is loaded into a recording/playback device. Recording/playback devices are sometimes called drive devices.

An opening portion is formed at a corner portion of the case of the recording tape cartridge, and the recording tape can pass through this opening portion. A leader block is attached to the distal end portion of the recording tape. When the recording tape cartridge is loaded into a drive device, a pull-out pin provided at the drive device engages with an engagement portion of the leader block so as to manipulate the leader block and pull the recording tape out from the interior of the case.

Here, the leader block is accommodated within a leader block accommodating portion, and is in a state in which it is flush with the outer peripheral surface of a reel hub. This accommodating portion is provided at the reel hub of a take-up reel provided at the drive device. In this state, the take-up reel is rotated, and the recording tape is taken-up onto the reel hub. Recording of information onto the recording tape or playback of information recorded on the recording tape is carried out by a recording/playback head of the drive device.

In this way, the recording tape is taken-up until the end thereof by the take-up reel. Then, the reel and the take-up reel are driven to rotate reversely, and the recording tape is rewound onto the reel.

The leader block is attached to the surface of the case of the recording tape cartridge in a state in which the leader block is exposed. The leader block functions as the cover of the opening portion through which the recording tape passes. When the recording tape is rewound completely, the leader block is caught by catching potions provided at the peripheral edge portions of the opening. The leader block closes the opening portion of the case. At this time, if the recording tape cartridge is dropped and receives a shock, the leader block flies out from the recording tape cartridge. Accordingly, even if the leader block functions as a cover, the leader block flying out from the recording tape cartridge due to the recording tape cartridge being dropped results in a deterioration in the dustproof quality.

Further, because the leader block is exposed at the surface of the case, the leader block becomes dirtied and is scratched. Dirt and scratches are causes for troubles in functioning. Moreover, because the leader block is positioned at a corner portion of the case, if the case is dropped, it is easy for the leader block to receive the concentrated shock.

SUMMARY OF THE INVENTION

In view of the aforementioned, an object of the present invention is to provide a recording tape cartridge in which a leader block can be prevented from flying out when the recording tape cartridge is dropped or the like.

In the recording tape cartridge of the present invention, a reel is accommodated within a case so as to be freely rotatable. A recording tape is wound on the reel. A leader block is provided at the distal end portion of the recording tape.

An opening portion, through which the leader block can pass, is formed in the case. The opening portion allows access to the leader block. A cover is provided at the opening portion. The cover opens and closes by sliding, and is resiliently urged in the closing direction, and contacts the opening portion side of the leader block.

In this way, by providing the cover which opens and closing the opening portion, there is no need for the leader block to open and close the opening portion. Further, the leader block can be accommodated within the case. Thus, troubles in functioning which are caused by the leader block being dirtied or scratched do not arise.

The cover is urged in the closing direction, and contacts the opening portion side of the leader block. Thus, the frictional force with respect to movement of the cover can be increased. Therefore, the cover does not open due to shock caused by the recording tape cartridge being dropped, and the dustproof quality is good. Moreover, because the cover does not open, the leader block does not fly out from the recording tape cartridge.

Specifically, a groove portion is provided at the leader block. A convex rail, which can fit together with the groove portion with a predetermined clearance therebetween, is provided at the cover. The leader block and the cover contact one another. The groove portion of the leader block can be replaced by a convex portion. When a convex portion is used, the corresponding rail is made to be groove-shaped.

The convex rail of the cover fits into the groove portion of the leader block with a predetermined clearance therebetween. In this way, even if the cover were to open for an instant when the case is dropped, due to the fitting-together of the groove portion and the convex rail, the leader block provides a vertical effect of a certain extent with respect to the sliding direction of the cover. Therefore, the frictional force increases, and the cover can be prevented from opening completely.

Moreover, there is no need to provide a lock mechanism at the cover for preventing the cover from opening. Accordingly, as compared with a case in which such a lock mechanism is provided, the number of parts can be reduced. Accordingly, costs can be reduced, and assembly can be facilitated due to the simplification of the structure.

Further, the leader block is disposed apart from a corner portion of the case by a distance which is at least twice the thickness of the peripheral wall of the case. Therefore, when the case is dropped, the leader block does not receive a concentrated shock. Accordingly, there is no concern that the leader block will deform or the like due to the case being dropped.

BRIEF DESCRIPTION OF THE DRAWINGS

FIG. 3A is a perspective view which shows a state in which a door is closed, and in which an opening portion and a leader block of the magnetic tape cartridge relating to the embodiment of the present invention are shown in an enlarged manner.

FIG. 3B is a perspective view which shows a state in which the door is opened, and in which the opening portion and the leader block of the magnetic tape cartridge relating to the embodiment of the present invention are shown in an enlarged manner.

FIG. 5A is a perspective view which shows a state in which a door is closed.

FIG. 5B is a perspective view which shows a state in which the door is opened.

DETAILED DESCRIPTION OF THE EMBODIMENT

Here, a recording tape cartridge relating to an embodiment of the present invention (which will be called "magnetic tape cartridge" hereinafter) will be summarily described.

Figure 1:
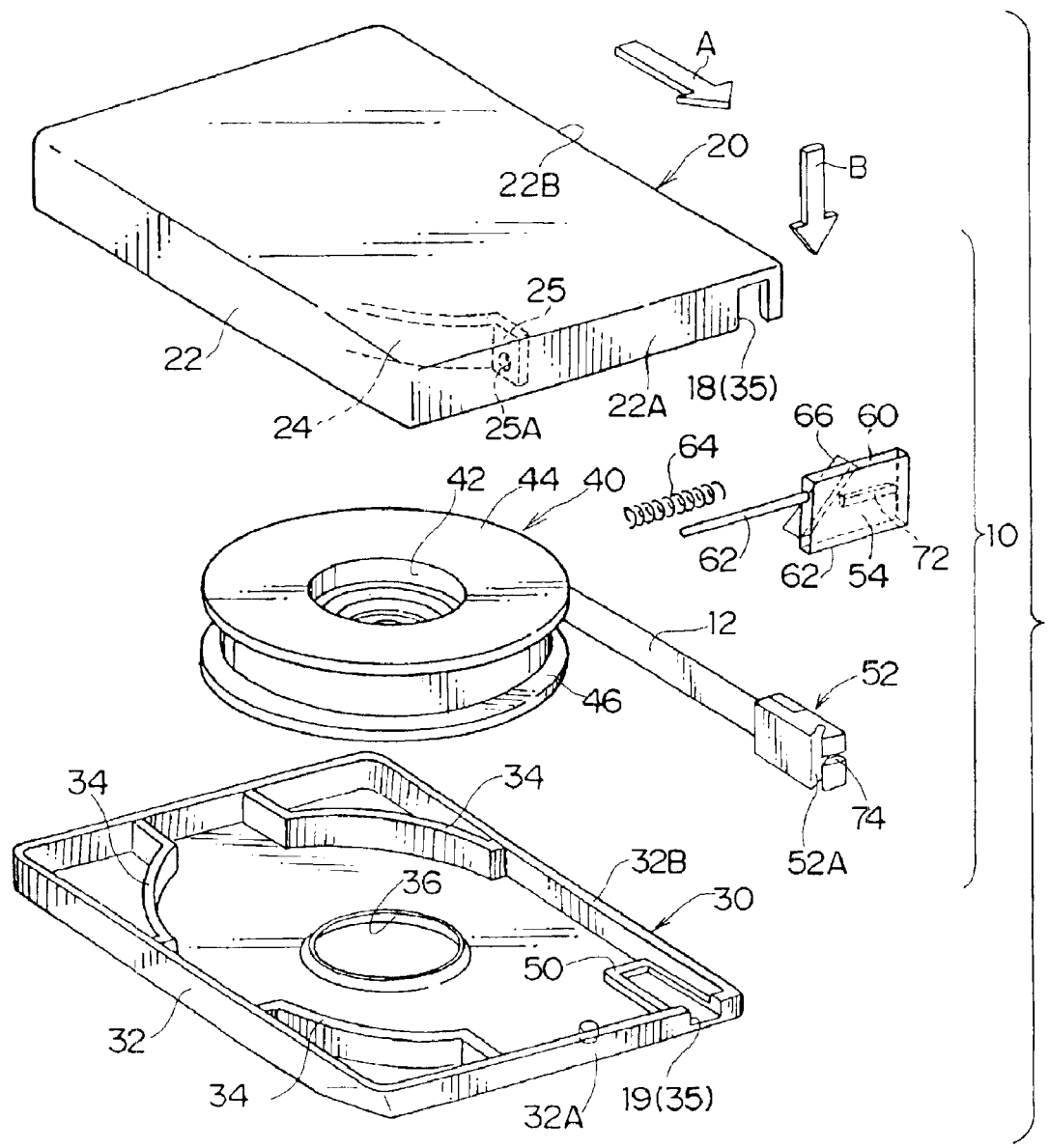
FIG. 1 is an exploded perspective view showing the overall structure of a magnetic tape cartridge relating to an embodiment of the present invention.
Figure 2:
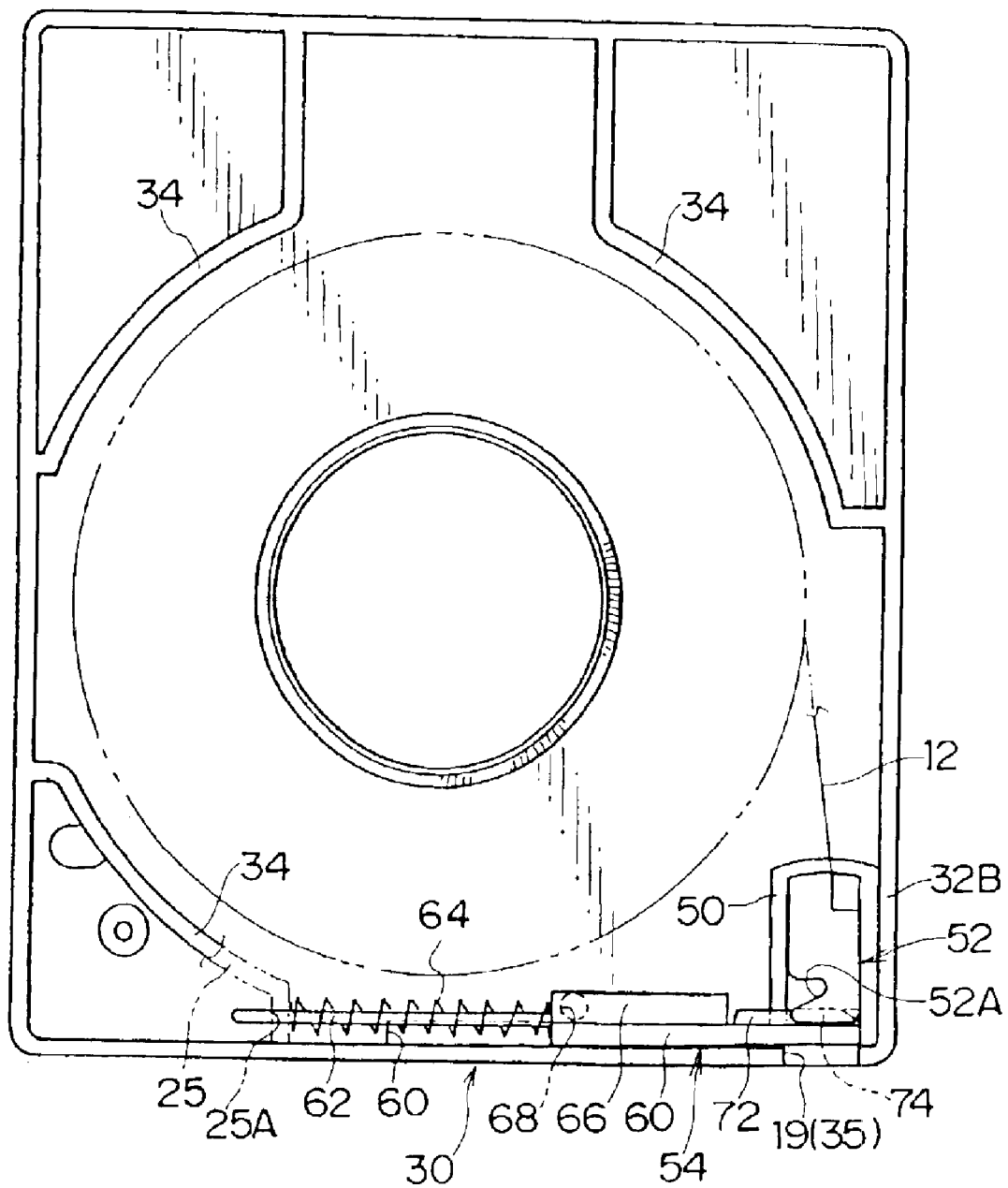
FIG. 2 is a plan view of a lower case forming the magnetic tape cartridge relating to the embodiment of the present invention.

For convenience of explanation, the direction of loading a magnetic tape cartridge 10 shown in FIG. 1 into an unillustrated drive device (i.e., the direction of arrow A) will be called the front direction, and the direction of arrow B will be called the downward direction. Front, back, left, right, up and down will be expressed by using, as a reference, a case of looking in the direction of arrow A.

The magnetic tape cartridge 10 is formed in a substantially rectangular box shape in which an upper case 20 and a lower case 30, which are formed of a synthetic resin, are joined together by ultrasonic welding or the like in a state in which peripheral walls 22, 32 thereof abut one another. Play restricting walls 24, 34, which are formed in circular arc shapes, stand erect at the inner surfaces of the upper case 20 and the lower case 30. A single reel 40, on which a magnetic tape 12 serving as an information recording/playback medium is wound, is rotatably accommodated at the inner sides of the play restricting walls 24, 34.

At the reel 40, a reel hub 42, which is hollow-cylindrical and around which the magnetic tape 12 is wound, and a lower flange portion 46, which projects out in the radial direction from the outer periphery of the lower end of the reel hub 42, are molded integrally from a synthetic resin. An upper flange portion 44, which has the same shape as the lower flange portion 46, is joined by ultrasonic welding or the like to the upper end of the reel hub 42.

An annular reel gear (not shown) is provided at the bottom surface of the reel 40, and emerges out from a circular open hole 36 formed in the center of the lower case 30. When the magnetic tape cartridge 10 is loaded into a drive device and is set at a predetermined position, a driving gear, which forms a driving device provided at the drive device, meshes with the reel gear. In this way, the driving force of the driving device is transmitted to the reel 40 such that the reel 40 can be rotated.

Cut-out portions 18, 19 are respectively formed in the left corner portions of peripheral walls 22A, 32A of the upper case 20 and the lower case 30, which peripheral walls 22A, 32A are positioned at the front of the magnetic tape cartridge 10. An opening portion 35 is formed by the cut-out portions 18, 19.

A holder portion 50 is formed in a projecting manner along a left side peripheral wall 32B of the lower case 30 in a vicinity of the cut-out portion 19. Because the upper case 20 has substantially the same structure as that of the lower case 30, description of the upper case 20 will be omitted.

The holder portions 50 are formed in substantial U shapes, and open toward the opening portion 35 side. A leader block 52, which is attached to the distal end portion of the magnetic tape 12, can be accommodated in the holder portions 50. The leader block 52 can thereby be accommodated within the magnetic tape cartridge 10.

The opening portion 35 can be opened and closed by a door 54 serving as a cover. When the opening portion 35 is closed, the door 54 abuts or contacts the distal end portion of the leader block 52 and, together with the holder portions 50, restricts movement of the leader block 52. Details will be described later.

An engagement portion 52A is formed as a recess in the outer periphery of the distal end side of the leader block 52. In the state in which the door 54 is opened, when a hook 56 (see FIG. 3B) of the drive device passes through the opening portion 35, the hook 56 engages with the engagement portion 52A of the leader block 52, and pulls the magnetic tape 12 out via the leader block 52.

In this way, the pulled-out magnetic tape 12 is taken-up by a take-up reel provided at the drive device. At this time, while the reel 40 is driven to rotate synchronously with the take-up reel and the magnetic tape 12 is successively taken-up onto the take-up reel, recording or playback of information is carried out.

Next, the main portions of the recording tape cartridge relating to the embodiment of the present invention will be described.

As shown in FIGS. 1, 2, 3A and 3B, a groove portion 58 is formed in a recessed manner along the peripheral wall 32A in a vicinity of the cut-out portion 19 of the lower case 30. Because the upper case 20 has substantially the same structure as the lower case 30, description of the lower case 20 will be omitted.

Convex portions 60 are formed at the top and bottom end surfaces of the door 54. The convex portions 60 fit together with the groove portions 58 so as to be able to move along the groove portions 58. Further, a shaft 62 projects out from the central portion of the right end surface of the door 54. The shaft 62 can be inserted through a through hole 25A formed in a reinforcing rib 25 which spans between the peripheral wall 22A and an end portion of the play regulating wall 24 provided at the upper case 20.

The shaft 62 is inserted through a coil spring 64. One end portion of the coil spring 64 abuts the door 54, whereas the other end portion of the coil spring 64 abuts the reinforcing rib 25. The coil spring 64 urges the door 54 in the closing direction.

A cam 66, which forms an inclined surface which slopes downward to the right, projects at the right side of the reverse surface of the door 54 (at the inner surface side of the lower case 30). A through hole 68 is formed in the bottom surface of the lower case 30 at a position opposing the lower side of the cam 66 in the state in which the door 54 is closed.

An engagement pin 70 provided at the drive device can be inserted into the through hole 68. When the magnetic tape cartridge 10 is loaded into the drive device and is lowered via a bucket (not illustrated) which holds the magnetic tape cartridge 10, the magnetic tape cartridge 10 is positioned, and simultaneously, the engagement pin 70 is inserted through the through hole 68.

When the engagement pin 70 is inserted through the through hole 68, the bottom side of the cam 66 abuts the engagement pin 70 such that the bottom side of the cam 66 is pushed upward. Because the cam 66 is formed as an inclined surface which tilts downward to the right, the door 54 moves via the cam 66 in a direction against the urging force of the coil spring 64 (i.e., moves in the direction of the arrow) while the cam 66 is guided by the distal end of the engagement pin 70. In this way, the opening portion 35 is opened.

At the time when the magnetic tape cartridge 10 is to be removed from the drive device, when the magnetic tape cartridge 10 is raised up, the through hole 68 comes off of the engagement pin 70. Thus, the door 54 is closed by the urging force of the coil spring 64.

A convex rail 72 is provided along the sliding direction of the door 54, at the reverse surface side of the door 54 (the side at the interior of the magnetic tape cartridge 10). The rail 72 is disposed at a position at which it faces the leader block 52 in the state in which the door 54 is closed.

A groove portion 74 is formed in a recessed manner in the distal end portion of the leader block 52 along a direction orthogonal to the direction in which the leader block 52 is pulled-out. In the state in which the door 54 is closed, the groove portion 74 can fit together with the convex rail 72 with a clearance therebetween. In the state in which the door 54 is closed, the groove portion 74 restricts vertical direction movement of the leader block 52. The convex rail 72 slides within the groove portion 74 due to opening and closing of the door 54.

Next, operation of the recording tape cartridge relating to the embodiment of the present invention will be described.

By providing the door 54 which opens and closes the opening portion 35 through which the magnetic tape 12 passes, there is no need for the leader block 52 to open and close the opening portion 35, and the leader block 52 can be accommodated within the magnetic tape cartridge 10. Thus, troubles in functioning caused by the leader block 52 being dirtied or scratched do not arise.

The door 54 is always urged in the closing direction, and contacts the opening portion 35 side of the leader block 52. Thus, frictional force with respect to movement of the door 54 can be increased. Therefore, the door 54 does not open due to shock caused by dropping, and the dustproof quality is good. Moreover, because the door 54 does not open, the leader block 52 does not fly out from the magnetic tape cartridge 10.

The groove portion 74 is provided at the leader block 52. The convex rail 72, which can fit together with the groove portion 74 with a predetermined clearance therebetween, is provided at the door 54. The leader block 52 and the door 54 contact one another. In accordance with this structure, when the magnetic tape cartridge 10 is dropped, even if the door 54 were to open for an instant, due to the engagement of the groove portion 74 and the convex rail 72, the leader block 52 provides a vertical effect of a certain extent with respect to the sliding direction of the door 54. Accordingly, the frictional force increases, and the door 54 can be prevented from being opened completely.

Further, there is no need to provide a lock mechanism or the like for preventing the door 54 from opening. Accordingly, as compared with a case in which a lock mechanism is provided, the number of parts can be reduced, costs can be reduced, and assembly can be facilitated due to the mechanism being simplified.

Moreover, the leader block 52 is disposed at a distance from the corner portion of the magnetic tape cartridge 10, which distance is at least twice the thickness of the peripheral walls 22B, 32B of the upper case 20 and the lower case 30. In this way, when the magnetic tape cartridge 10 is dropped, the leader block 52 does not receive a concentrated shock. Accordingly, there is no concern that the leader block 52 will deform or the like due to the magnetic tape cartridge 10 being dropped.

Here, the groove portion 74 is provided at the leader block 52, and the convex rail 72, which can fit together with the groove portion 74, is provided at the door 54, and the leader block 52 and the door 54 contact one another. However, the present invention is not limited to such a structure. Various modifications are possible provided that, due to the contact of the leader block 52 and the door 54, the leader block 52 provides a vertical effect of a certain extent with respect to the sliding direction of the door 54, such that the frictional force is increased and the door 54 can be prevented from opening completely.

Figure 4:
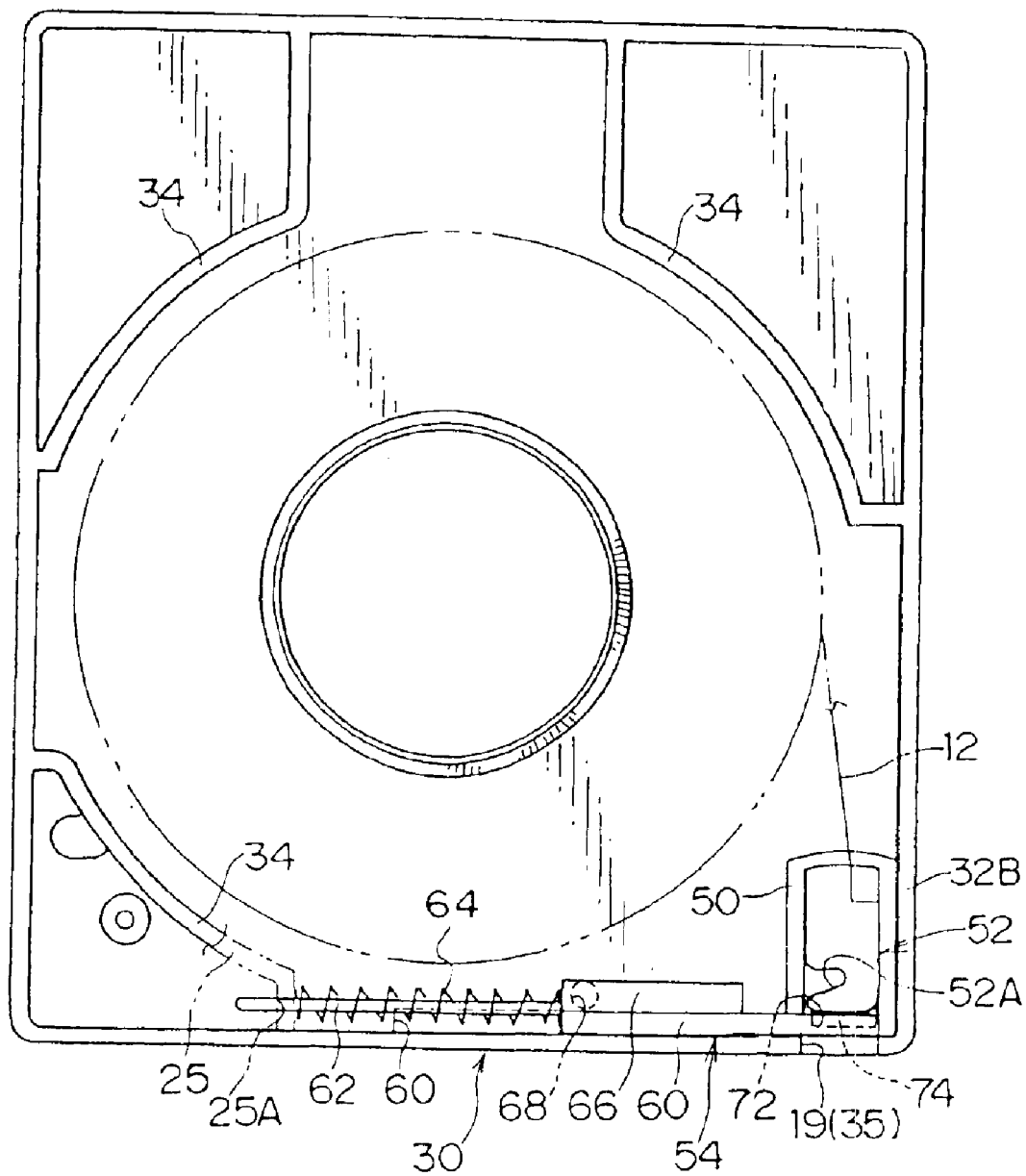
FIG. 4 is a plan view of a lower case forming the magnetic tape cartridge relating to an embodiment of the present invention.

For example, as shown in FIGS. 4, 5A and 5B, a convex portion 72 may be provided at the leader block 52, and a groove portion 74, which can fit together with this convex portion 72, may be provided at the door 54, such that the leader block 52 and the door 54 contact one another.

Further, the structure in which the door 54 is resiliently urged in the closing direction by the coil spring 64 is used as the structure for closing the door 54. However, the present invention is not limited to this structure. Various modifications are possible provided that the door 54 can be urged in the closing direction in the state in which the magnetic tape cartridge 10 is not being used. For example, an urging device such as a plate spring may be used.

Moreover, although the magnetic tape 12 is used as the recording tape, the present invention is not limited to the same. It suffices for the recording tape to be interpreted as an information recording/playback medium on which information can be recorded and from which recorded information can be played back. It goes without saying that the recording tape cartridge relating to the present invention can be applied to recording tapes of any type of recording/playback system. The cartridge of the present invention may also be applied to magnetic disks.

Because the present invention has the above-described structure, by providing the cover which opens and closes the opening portion, the leader block can be accommodated within the case without there being the need for the leader block to open and close the opening portion. Thus, trouble in functioning caused by the leader block becoming dirtied or scratched does not arise. Moreover, because the cover is urged in the closing direction and contacts the opening portion side of the leader block, the frictional force with respect to the movement of the cover can be increased. Thus, the cover does not open due to shock caused by dropping, and the dustproof quality is good. Moreover, because the cover does not open, the leader block does not fly out from the magnetic tape cartridge.

What is claimed is:

1. A recording tape cartridge comprising:
   a recording tape wound on a reel which is accommodated within a case so as to be freely rotatable;
   a leader block provided at a distal end portion of the recording tape;
   an opening portion formed in the case such that the leader block can pass through the opening portion, and allowing access to the leader block; and
   a cover slidably mounted to the recording tape cartridge, so as to open and close the opening portion, and being urged in a closing direction, and configured to come into contact with an opening portion side of the leader block,
   wherein the leader block has a groove portion, and the cover has a rail which corresponds to the groove portion and which extends along a sliding direction of the cover, and, when the cover is closed, the groove portion fits together with the rail such that a clearance is formed between the groove portion and the rail.

2. The cartridge of claim 1, further comprising an urging device which abuts one end of the cover and resiliently urges the cover in the closing direction.

3. The cartridge of claim 2, wherein the urging device comprises a coil spring, and a shaft projecting from the cover is inserted in the coil spring, and an end portion of the coil spring abuts a reinforcing rib of the case.

4. The cartridge of claim 2, wherein the case is linearly slidable.

5. The cartridge of claim 4, wherein a hole portion for a pin member to be inserted therein is formed on a bottom surface of the case, and the pin member is slidable by abutting the cover.

6. The cartridge of claim 4, wherein the cover comprises a cam.

7. The cartridge of claim 6, wherein a hole portion is formed as a positioning reference of the cartridge.

8. The cartridge of claim 1, wherein the case has a corner and a peripheral wall, and the leader block is disposed a predetermined distance away from the corner.

9. The cartridge of claim 8, wherein the predetermined distance at which the leader block is disposed is two or more times a thickness of the peripheral wall.

10. The cartridge of claim 1, wherein the recording tape is a magnetic tape.

11. The cartridge of claim 1, wherein the groove portion is provided at a side facing the opening portion of the case, and the rail is provided at an interior side of the cover.

12. The cartridge of claim 11, wherein the leader block is provided with a predetermined distance from a corner of the case.

13. The cartridge of claim 12, wherein the predetermined distance at which the leader block is disposed is two or more times a thickness of a peripheral wall of the case.

14. A recording tape cartridge comprising:
    a recording tape wound on a reel which is accommodated within a case so as to be freely rotatable;
    a leader block provided at a distal end portion of the recording tape;
    an opening portion formed in the case such that the leader block can pass through the opening portion and allowing access to the leader block; and
    a cover slidably mounted to the recording tape cartridge, so as to open and close the opening portion, and being urged in a closing direction, and configured to come into contact with an opening portion side of the leader block,
    wherein the leader block has a convex portion, and the cover has a groove-shaped rail which corresponds to the convex portion and which extends along a sliding direction of the cover, and, when the cover is closed, the convex portion fits together with the rail such that a clearance is formed between the convex portion and the rail.

15. The cartridge of claim 14, wherein the convex portion is provided at a side facing the opening portion of the case, and the rail is provided at an interior side of the cover.

16. The cartridge of claim 15, wherein the leader block is provided with a predetermined distance from a corner of the case.

17. The cartridge of claim 16, wherein the predetermined distance at which the leader block is disposed is two or more times a thickness of a peripheral wall of the case.

18. A method of closing an opening of a recording tape cartridge having the opening through which a recording tape and a leader block attached to a distal end of the recording tape can pass, said method comprising the steps of:
    accommodating the leader block, which is attached to the distal end of the recording tape, within the cartridge; and
    closing the opening by using a door which is slidably mounted with a wall surface of the cartridge,
    wherein the leader block has a groove portion, and the door has a rail which corresponds to the groove portion and which extends along a sliding direction of the door, and, when the door is closed, the groove portion fits together with the rail such that a clearance is formed between the groove portion and the rail.

19. The method of claim 18, wherein the closing of the opening includes sliding while maintaining a fit-together state of the cartridge and the wall surface by using a groove and a convex portion.

20. The method of claim 19, wherein the sliding includes regulating movement of the leader block.

21. The method of claim 19, wherein the sliding includes using resilient urging force along a sliding direction of the door.

22. The method of claim 21, wherein the using of resilient urging force includes always urging the door in a closing direction.

23. The method of claim 22, wherein the always urging the door in a closing direction includes getting the door in contact with a portion of the leader block.

24. A method of closing an opening of a recording tape cartridge having the opening through which a recording tape and a leader block attached to a distal end of the recording tape can pass, said method comprising the steps of:
    accommodating the leader block, which is attached to the distal end of the recording tape, within the cartridge; and
    closing the opening by using a door which is slidably mounted with a wall surface of the cartridge,
    wherein the leader block has a convex portion, and the door has a groove-shaped rail which corresponds to the convex portion and which extends along a sliding direction of the door, and, when the door is closed, the convex portion fits together with the rail such that a clearance is formed between the convex portion and the rail.

* * * * *